(12) United States Patent
Enzmann et al.

(10) Patent No.: US 11,892,651 B2
(45) Date of Patent: Feb. 6, 2024

(54) OPTICALLY EFFECTIVE ELEMENT, METHOD OF PRODUCING AN OPTICALLY EFFECTIVE ELEMENT, AND OPTOELECTRONIC COMPONENT

(71) Applicant: OSRAM OLED GmbH, Regensburg (DE)

(72) Inventors: Roland Enzmann, Regensburg (DE); Hubert Halbritter, Dietfurt-Toeging (DE); Markus Arzberger, Sunnyvale, CA (US); Andreas Ploessl, Regensburg (DE); Roland Schulz, Regensburg (DE); Georg Rossbach, Regensburg (DE); Bernd Boehm, Obertraubling (DE); Frank Singer, Reganstauf (DE); Matthias Sabathil, Regensburg (DE)

(73) Assignee: OSRAM OLED GmbH, Regensburg (DE)

( * ) Notice: Subject to any disclaimer, the term of this patent is extended or adjusted under 35 U.S.C. 154(b) by 287 days.

(21) Appl. No.: 17/219,943

(22) Filed: Apr. 1, 2021

(65) Prior Publication Data

US 2021/0223559 A1    Jul. 22, 2021

Related U.S. Application Data

(62) Division of application No. 15/693,531, filed on Sep. 1, 2017, now Pat. No. 10,996,482.

(30) Foreign Application Priority Data

Sep. 7, 2016  (DE) .................... 10 2016 116 747.9
Sep. 7, 2016  (DE) .................... 10 2016 116 748.7
Sep. 7, 2016  (DE) .................... 10 2016 116 749.5

(51) Int. Cl.
G02B 27/09   (2006.01)
G02B 5/18    (2006.01)
G02B 3/00    (2006.01)

(52) U.S. Cl.
CPC ....... G02B 27/0916 (2013.01); G02B 3/0075 (2013.01); G02B 5/1814 (2013.01);
(Continued)

(58) Field of Classification Search
CPC   G02B 27/0916; G02B 3/0075; G02B 5/1814; G02B 5/1857; G02B 5/1866; G02B 27/0944; G02B 27/0961
(Continued)

(56) References Cited

U.S. PATENT DOCUMENTS 5,258,871 A    11/1993   Gupta
5,496,616 A    3/1996    Harris
(Continued)

FOREIGN PATENT DOCUMENTS

DE    20 2004 019 052 U1    12/2005
WO    2015/174089 A1        11/2015

OTHER PUBLICATIONS

Search Report dated Apr. 26, 2017 in counterpart German Application No. 10 2016 116 747.9.
(Continued)

Primary Examiner — Joseph P Martinez
Assistant Examiner — Grant A Gagnon
(74) Attorney, Agent, or Firm — DLA Piper LLP (US)

(57) ABSTRACT

An optoelectronic component includes an optoelectronic semiconductor chip configured to emit electromagnetic radiation; an optically effective element arranged such that electromagnetic radiation emitted by the optoelectronic semiconductor chip passes through the optically effective element; and a housing, wherein the optoelectronic semi-
(Continued)

conductor chip is arranged in a cavity of the housing, the optically effective element includes a carrier, a first optically effective structure arranged on a top side of the carrier, and a cover arranged above the first optically effective structure.

30 Claims, 11 Drawing Sheets

(52) U.S. Cl.
CPC ......... *G02B 5/1857* (2013.01); *G02B 5/1866* (2013.01); *G02B 27/0944* (2013.01); *G02B 27/0961* (2013.01)

(58) Field of Classification Search
USPC ........................................................ 359/576
See application file for complete search history.

(56) References Cited

U.S. PATENT DOCUMENTS

| | | |
|---|---|---|
| 5,760,960 A | 6/1998 | Lin et al. |
| 6,278,548 B1 | 8/2001 | Shimano et al. |
| 2002/0024734 A1 | 2/2002 | Nakabayashi |
| 2002/0042024 A1 | 4/2002 | Tanaka et al. |
| 2003/0044728 A1 | 3/2003 | Terada et al. |
| 2004/0233534 A1 | 11/2004 | Nakanishi et al. |
| 2006/0077554 A1 | 4/2006 | Schenk |
| 2006/0132919 A1 | 6/2006 | Schnell et al. |
| 2008/0024866 A1 | 1/2008 | Walter et al. |
| 2013/0084039 A1 | 4/2013 | Doany et al. |
| 2017/0077070 A1* | 3/2017 | Schwarz ............. H01L 25/0753 |
| 2017/0357141 A1 | 12/2017 | DeSmet et al. |

OTHER PUBLICATIONS

Search Report dated Apr. 26, 2017 in counterpart German Application No. 10 2016 116 748.7.
Search Report dated Apr. 26, 2017 in counterpart German Application No. 10 2016 116 749.5.

* cited by examiner

OPTICALLY EFFECTIVE ELEMENT, METHOD OF PRODUCING AN OPTICALLY EFFECTIVE ELEMENT, AND OPTOELECTRONIC COMPONENT

RELATED APPLICATIONS

This is a divisional of U.S. Ser. No. 15/693,531, filed Sep. 1, 2017, which claims priority of DE 10 2016 116 749.5, DE 10 2016 116 748.7 and DE 10 2016 116 747.9, the subject matter of which is incorporated herein by reference.

TECHNICAL FIELD

This disclosure relates to an optically effective element, a method of producing an optically effective element, and an optoelectronic component.

BACKGROUND

Diffractive optical elements and multi-lens arrays are known and used, for example, to generate light patterns and attenuate light beams.

SUMMARY

We provide an optically effective element including a carrier, a first optically effective structure arranged on a top side of the carrier, and a cover arranged above the first optically effective structure.

We also provide a method of producing an optically effective element including providing a carrier, forming a first optically effective structure on a top side of the carrier, and arranging a cover above the top side of the carrier and the first optically effective structure.

We further provide an optoelectronic component including an optoelectronic semiconductor chip configured to emit electromagnetic radiation, and the optically effective element including a carrier, a first optically effective structure arranged on a top side of the carrier, and a cover arranged above the first optically effective structure, wherein the optically effective element is arranged such that electromagnetic radiation emitted by the optoelectronic semiconductor chip passes through the optically effective element.

We further yet provide an optoelectronic component including an optoelectronic semiconductor chip configured to emit electromagnetic radiation, an optically effective element arranged such that electromagnetic radiation emitted by the optoelectronic semiconductor chip passes through the optically effective element, and a housing, wherein the optoelectronic semiconductor chip is arranged in a cavity of the housing, the optically effective element includes a carrier, a first optically effective structure arranged on a top side of the carrier, and a cover arranged above the first optically effective structure.

DETAILED DESCRIPTION

Our optically effective element may comprise a carrier, a first optically effective structure arranged on a top side of the carrier, and a cover arranged above the first optically effective structure.

Our method of producing an optically effective element may comprise steps of providing a carrier, forming a first optically effective structure on a top side of the carrier, and arranging a cover above the top side of the carrier and the first optically effective structure.

Our optoelectronic may component comprise an optoelectronic semiconductor chip configured to emit electromagnetic radiation, and an optically effective element. In this example, the optically effective element is arranged such that electromagnetic radiation emitted by the optoelectronic semiconductor chip passes through the optically effective element.

The above-described properties, features and advantages and the way in which they are achieved will become clearer and more clearly understood in association with the following description of examples explained in greater detail in association with the drawings.

Figure 1:
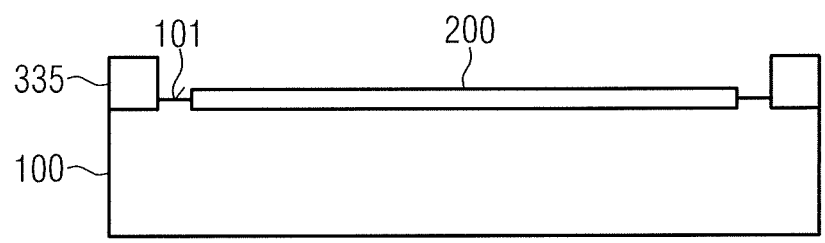
FIG. 1 shows a schematic sectional side view of a carrier with a diffractive structure arranged on the top side of the carrier.
Figure 2:
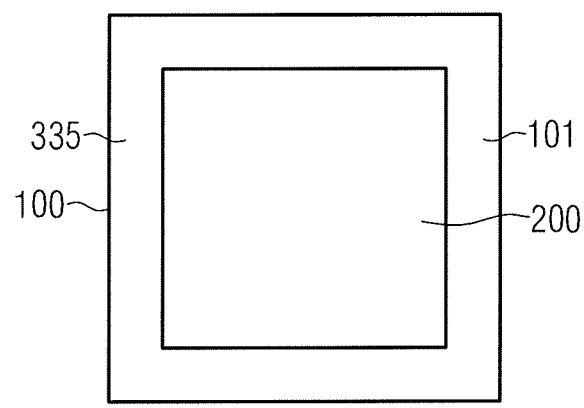
FIG. 2 shows a schematic plan view of the top side of the carrier.

FIG. 1 shows a schematic sectional side view of a carrier 100 provided for producing a diffractive optical element. The carrier 100 is formed as a flat sheet having a planar top side 101. FIG. 2 shows, in schematic illustration, a plan view of the top side 101 of the carrier 100. In the example shown in FIGS. 1 and 2, the carrier 100 comprises an approximately square shape in a lateral direction. However, the carrier 100 could also comprise a different rectangular shape, a circular disk shape or some other shape. The carrier 100 may also be referred to as a substrate.

The carrier 100 comprises a material transparent to electromagnetic radiation in at least some wavelength ranges, for example, to visible light and/or to light comprising a wavelength from the infrared spectral range. The carrier 100 may comprise, for example, sapphire or a glass.

In a direction perpendicular to the top side 101 of the carrier 100, the carrier 100 may comprise, for example, a thickness of approximately 0.3 mm. However, the carrier 100 may also comprise a smaller thickness, for example, a thickness of at least 50 µm or 75 µm. In a lateral direction, the carrier 100 may comprise, for example, an edge length of 2.7 mm or less.

A diffractive structure 200 is arranged on the top side 101 of the carrier 100. The diffractive structure 200 is configured to shape by diffraction light that passes through the carrier 100 and the diffractive structure 200 in a direction perpendicular to the top side 101 of the carrier 100. For this purpose, the diffractive structure 200 is suitably structured in a known manner.

The diffractive structure 200 may comprise a plastics material. By way of example, the diffractive structure 200 may comprise an epoxy, for example, a UV-curing epoxy. Alternatively, the diffractive structure 200 may also comprise a silicone, polycarbonate or polymethyl methacrylate. Particularly for applications in the infrared range, a use of polyetherimide or polysulfone is also possible.

The diffractive structure 200 does not completely cover the top side 101 of the carrier 100. An edge region of the top side 101 of the carrier 100, the edge region completely enclosing the diffractive structure 200, is not covered by the diffractive structure 200. A metallization 335 has been arranged in the edge region of the top side 101 of the carrier 100. The metallization 335 completely encloses the diffractive structure 200 on the top side 101 of the carrier 100.

The metallization 335 may comprise, for example, a layer sequence of titanium, platinum and gold. The metallization 335 may have been arranged on the top side 101 of the carrier 100, for example, by vapor deposition or some other deposition method. Arranging the metallization 335 may have been carried out before or after the process of forming the diffractive structure 200 on the top side 101 of the carrier 100.

Figure 3:
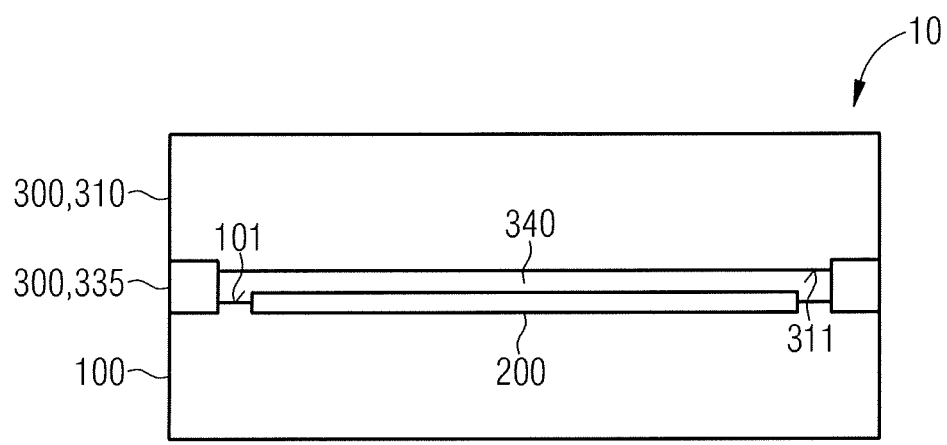
FIG. 3 shows a schematic sectional side view of a diffractive optical element formed from the carrier, the diffractive structure and a covering plate arranged thereabove.

FIG. 3 shows a schematic sectional side view of the carrier 100 and of the diffractive structure 200 arranged above the top side 101 of the carrier 100 in a processing state temporally succeeding the illustrations in FIGS. 1 and 2.

A cover 300 has been arranged above the top side 101 of the carrier 100 and the diffractive structure 200. The cover 300 is formed as a flat covering plate 310 comprising a planar top side 311. The covering plate 310 has been arranged above the top side 101 of the carrier 100 and the diffractive structure 200 such that the top side 311 of the covering plate 310 faces the top side 101 of the carrier 100 and the diffractive structure 200.

The covering plate 310 may be formed, for example, as a glass plate. The covering plate 310 may also comprise sapphire. In a direction perpendicular to the top side 311 of the covering plate 310, the covering plate 310 may comprise a thickness of, for example, 0.3 mm. The covering plate 310 may also comprise a smaller thickness. The shape of the covering plate 310 may correspond to the shape of the carrier 100.

The covering plate 310 has been secured by a soldering connection 330 on the top side 101 of the carrier 100. The soldering connection 330 has been formed in the region of the metallization 335 arranged beforehand on the top side 101 of the carrier 100. The soldering connection 330 was formed at a temperature which did not lead to damage to the diffractive structure 200. The soldering connection 330 may be, for example, a soldering connection using gold and tin or gold, indium and tin. The soldering connection 330 may be a eutectic bond connection. The soldering connection may also have been produced by isothermal solidification.

The soldering connection 330 completely encloses the diffractive structure 200 arranged on the top side 101 of the carrier 100. As a result, the diffractive structure 200 is hermetically impermeably encapsulated and sealed in relation to the surroundings by the soldering connection 330.

The covering plate 310 has been arranged above the top side 101 of the carrier 100 such that a gap 340 has remained between the diffractive structure 200 arranged on the top side 101 of the carrier and the top side 311 of the covering plate 310 facing the top side 101 of the carrier 100. Air or some other gas may be arranged in the region of the gap 340. The region of the gap 340 is tightly sealed by the circumferential soldering connection 330.

The carrier 100, the diffractive structure 200 formed on the top side 101 of the carrier 100 and the cover 300 arranged above the top side 101 of the carrier 100 and the diffractive structure 200 jointly form a diffractive optical element 10. The diffractive optical element 10 is configured to shape electromagnetic radiation, for example, visible light or infrared light passing through the diffractive optical element 10 in a direction perpendicular to the top side 101 of the carrier 100. By way of example, the diffractive optical element 10 may be provided to generate a light pattern, for example, a point pattern. The diffractive optical element 10 may also be provided to attenuate a light beam, for example, a laser beam. By way of example, the diffractive optical element 10 may be provided to attenuate a laser beam generated by a laser device to an extent such that eye safety of the laser device is ensured.

Figure 4:
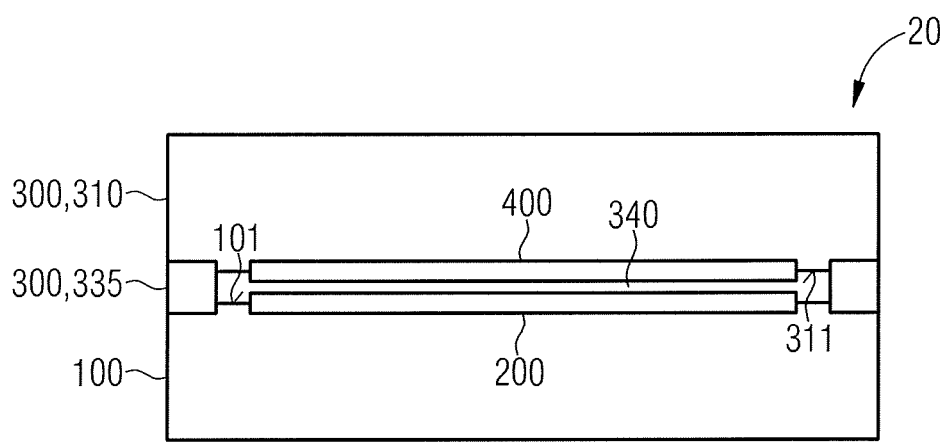
FIG. 4 shows a schematic sectional side view of a further diffractive optical element including two diffractive structures.

FIG. 4 shows a schematic sectional side view of a diffractive optical element 20 in accordance with an alternative example. The diffractive optical element 20 in FIG. 4 largely corresponds to the diffractive optical element 10 shown in FIG. 3. Component parts of the diffractive optical element 20 corresponding to component parts present in the diffractive optical element 10 are provided in FIG. 4 with the same reference signs as in FIG. 3. Only the differences between the diffractive optical element 20 in FIG. 4 and the diffractive optical element 10 in FIG. 3 are described below.

The diffractive optical element 20 comprises a further diffractive structure 400 on the top side 311 of the covering plate 310. The further diffractive structure 400 was formed on the top side 311 of the covering plate 310 before the covering plate 310 was arranged above the top side 101 of the carrier 100 and the diffractive structure 200 and connected to the carrier 100 via the soldering connection 330. The further diffractive structure 400 may have been formed in the same way as the diffractive structure 200 formed on the top side 101 of the carrier 100.

In the diffractive optical element 20, the carrier 100 and the covering plate 310 connect to one another by the soldering connection 330 such that the top side 101 of the carrier 100 and the top side 311 of the covering plate 310 face one another. As a result, the diffractive structure 200 arranged on the top side 101 of the carrier 100 and the further diffractive structure 400 arranged on the top side 311 of the covering plate 310 also face one another. The gap 340 is formed between the diffractive structure 200 and the further diffractive structure 400.

As a result of the presence of the two diffractive structures 200, 400, the diffractive optical element 20 may enable a more effective beam shaping or beam attenuation than the diffractive optical element 10, equipped only with one diffractive structure 200.

Figure 5:
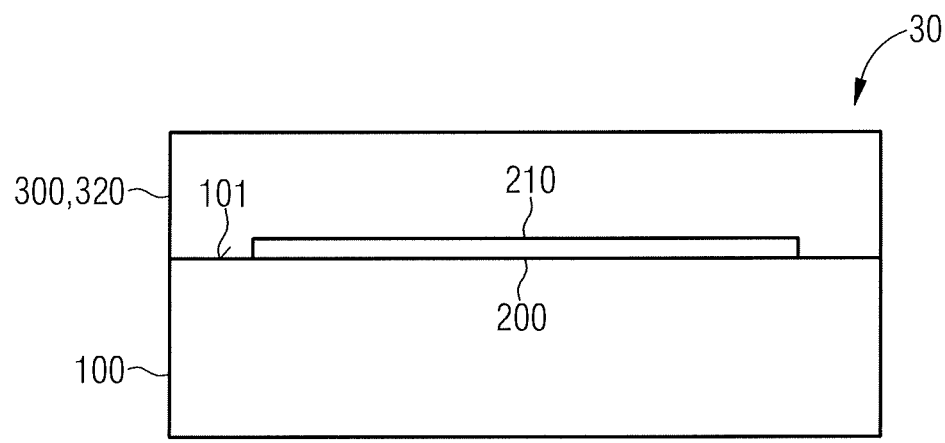
FIG. 5 shows a schematic sectional side view of a further diffractive optical element including a carrier, a diffractive structure and a covering layer arranged thereabove.

FIG. 5 shows a schematic sectional side view of a diffractive optical element 30 in accordance with a further example. The diffractive optical element 30 shown in FIG. 5 largely corresponds to the diffractive optical element 10 described with reference to FIG. 3. Component parts of the diffractive optical element 30 which correspond to component parts present in the diffractive optical element 10 are provided in FIG. 5 with the same reference signs as in FIG. 3. Only the differences between the diffractive optical element 30 in FIG. 5 and the diffractive optical element 10 in FIG. 3 are described below.

In the diffractive optical element 30 in FIG. 5, the diffractive structure 200 may be formed from a material comprising a high refractive index, for example, from a material comprising a refractive index of more than 2. By way of example, the diffractive structure 200 may comprise GaN, SiN, Si or GaP.

To form the diffractive structure 200 on the top side 101 of the carrier 100 of the diffractive optical element 30, first, a closed material layer 210 of the material of the diffractive structure 200 may have been applied on the top side 101 of the carrier 100. Applying the material 210 may have been carried out, for example, by vapor deposition, a cathode sputtering method or some other deposition method. The material layer 210 may subsequently have been structured, for example, by an etching method. In this example, parts of the material layer 210 that are not to be removed may have been protected by a mask.

In the diffractive optical element 30 in FIG. 5, the cover 300 arranged above the top side 101 of the carrier 100 and the diffractive structure 200 is formed as a covering layer 320 covering the top side 101 of the carrier 100 and the diffractive structure 200. The covering layer 320 covers the top side 101 of the carrier 100 and the diffractive structure 200 directly and without a gap formed between the diffractive structure 200 and the covering layer 320. The covering layer 320 may also extend in openings of the diffractive structure 200.

The covering layer 320 may comprise, for example, silicone, an epoxy, benzocyclobutene (BCB), $SiO_2$ or a glass. The covering layer 320 may have been arranged on the top side 101 of the carrier 100 and the diffractive structure 200, for example, by a cathode sputtering method.

Figure 6:
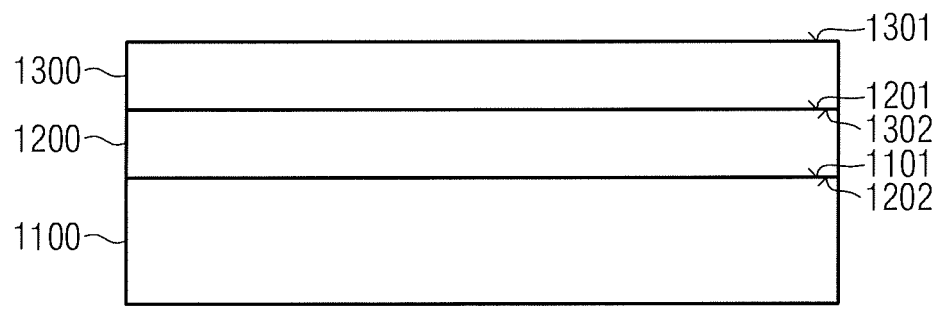
FIG. 6 shows a schematic sectional side view of a carrier with an inner dielectric layer arranged above the carrier and an outer dielectric layer arranged above the inner dielectric layer.

FIG. 6 shows a schematic sectional side view of a part of a carrier 1100. The carrier 1100 is formed as a flat sheet comprising a planar top side 1101.

The carrier 1100 comprises a material substantially transparent to electromagnetic radiation in at least some wavelength ranges, for example, to visible light or infrared light. The carrier 1100 may comprise, for example, sapphire or a glass.

An inner dielectric layer 1200 has been arranged above the top side 1101 of the carrier 1100. The inner dielectric layer 1200 is formed as a flat layer comprising a top side 1201 and an underside 1202 opposite the top side 1201. The underside 1202 of the inner dielectric layer 1200 faces the top side 1101 of the carrier 1100.

In the example shown in FIG. 6, the inner dielectric layer 1200 is arranged directly on the top side 1101 of the carrier 1100 such that the underside 1202 of the inner dielectric layer 1200 adjoins the top side 1101 of the carrier 1100. However, it would also be possible to provide one or more further layers between the top side 1101 of the carrier 1100 and the inner dielectric layer 1200.

The inner dielectric layer 1200 comprises a dielectric material comprising a first refractive index. The first refractive index of the inner dielectric layer 1200 differs from a refractive index of the carrier 1100. It is expedient for the first refractive index of the inner dielectric layer 1200 to be greater than the refractive index of the carrier 1100. The inner dielectric layer 1200 may comprise, for example, $MgF_2$ or $TiO_2$.

The inner dielectric layer 1200 may have been arranged on the carrier 1100, for example, by a cathode sputtering method.

An outer dielectric layer 1300 has been arranged above the inner dielectric layer 1200. The outer dielectric layer 1300 is a flat layer comprising a top side 1301 and an underside 1302 opposite the top side 1301. The underside 1302 of the outer dielectric layer 1300 faces the top side 1201 of the inner dielectric layer 1200.

In the example shown in FIG. 6, the outer dielectric layer 1300 is arranged directly on the inner dielectric layer 1200 such that the underside 1302 of the outer dielectric layer 1300 adjoins the top side 1201 of the inner dielectric layer 1200. Alternatively, however, it is possible to provide one or more intermediate layers between the inner dielectric layer 1200 and the outer dielectric layer 1300, as will be explained below with reference to FIG. 10.

The outer dielectric layer 1300 comprises a dielectric material comprising a second refractive index. It is expedient if the second refractive index of the outer dielectric layer 1300 comprises a value similar to the first refractive index of the inner dielectric layer 1200. The first refractive index of the inner dielectric layer 1200 and the second refractive index of the outer dielectric layer 1300 may differ, for example, by not more than 5%, not more than 10% or not more than 20%.

If the inner dielectric layer 1200 comprises $MgF_2$, then the outer dielectric layer 1300 may comprise $SiO_2$, for example. If the inner dielectric layer 1200 comprises $TiO_2$, then the outer dielectric layer 1300 may comprise $Si_3N_4$, for example.

The outer dielectric layer 1300 may have been arranged above the inner dielectric layer 1200, for example, by a cathode sputtering method.

Figure 7:
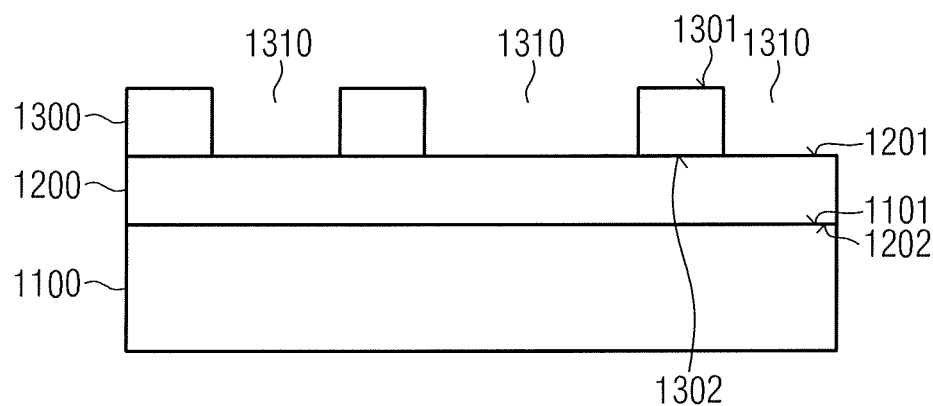
FIG. 7 shows a schematic sectional side view of the carrier and of the dielectric layers after a process of structuring the outer dielectric layer.

FIG. 7 shows a schematic sectional side view of the carrier 1100, of the inner dielectric layer 1200 arranged above the carrier 1100, and of the outer dielectric layer 1300 arranged above the inner dielectric layer 1200, in a processing state temporally succeeding the illustration in FIG. 6.

The outer dielectric layer 1300 has been structured to form outer openings 1310 in the outer dielectric layer 1300. The outer openings 1310 each extend from the top side 1301 of the outer dielectric layer 1300 as far as the underside 1302 of the outer dielectric layer 1300 through the outer dielectric layer 1300 as far as the top side 1201 of the inner dielectric layer 1200.

The structuring of the outer dielectric layer 1300 may have been carried out by a first etching method. The sections of the outer dielectric layer 1300 that have remained between the outer openings 1310 may have been protected by a mask during the performance of the first etching method. The first etching method may have been, for example, a wet-chemical etching method or a dry-chemical etching method.

The first etching method used to create the outer openings 1301 in the outer dielectric layer 1300 has attacked the outer dielectric layer 1300, but not the inner dielectric layer 1200. The inner dielectric layer 1200 has functioned as an etch stop layer during the performance of the first etching method.

If the outer dielectric layer 1300 comprises $SiO_2$, then the first etching method may have been, for example, a dry-chemical etching method using fluorine gas. If the outer dielectric layer 1300 comprises $Si_3N_4$, then the first etching method for structuring the outer dielectric layer 1300 may have been, for example, either a dry-chemical etching method using fluorine gas or a wet-chemical etching method using hydrofluoric acid.

Figure 8:
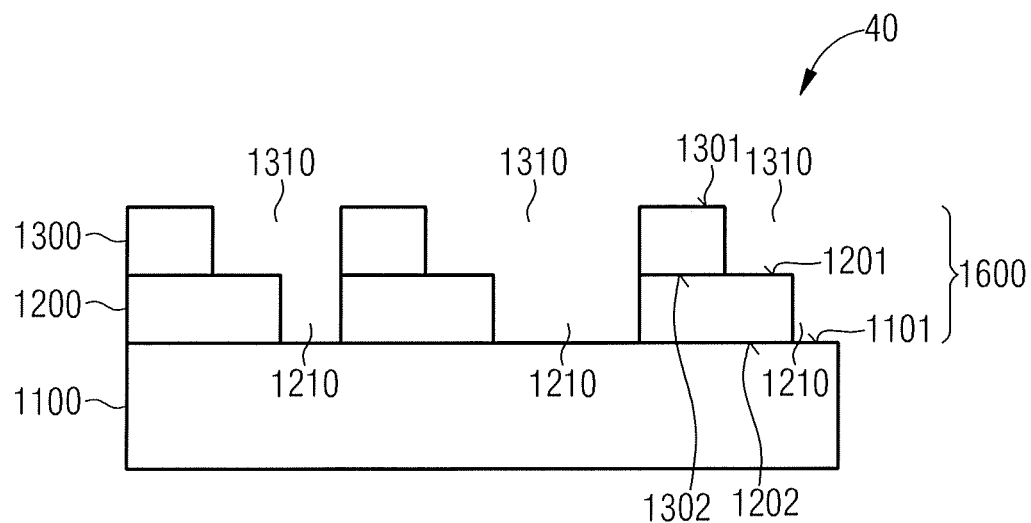
FIG. 8 shows a schematic sectional side view of the carrier and of the dielectric layers after a process of structuring the inner dielectric layer.

FIG. 8 shows a schematic sectional side view of the carrier 1100, of the inner dielectric layer 1200 arranged above the carrier 1100, and of the outer dielectric layer 1300 arranged above the inner dielectric layer 1200 in a processing state temporally succeeding the illustration in FIG. 7.

The inner dielectric layer 1200 has been structured to create inner openings 1210 in the inner dielectric layer 1200. The inner openings 1210 each extend completely through the inner dielectric layer 1200, from the top side 1201 of the inner dielectric layer 1200 as far as the underside 1202 of the inner dielectric layer 1200.

For the purpose of structuring the inner dielectric layer 1200, the material of the inner dielectric layer 1200 may have been selectively removed in the region of the inner openings 1210 to be formed, by a second etching method. The remaining parts of the inner dielectric layer 1200 may have been covered and protected by a mask.

The structuring of the inner dielectric layer 1200 has been carried out through the outer openings 1310 of the outer dielectric layer 1300. The etching medium used to partly remove the inner dielectric layer 1200 has penetrated through the outer openings 1310 in the outer dielectric layer 1300 to the inner dielectric layer 1200. As a result, the inner openings 1210 are arranged below the outer openings 1310. The inner openings 1210 in the inner dielectric layer 1200 may be smaller than the outer openings 1310 in the outer dielectric layer 1300, that is to say may comprise smaller diameters, for example.

The second etching method used to form the inner openings 1210 in the inner dielectric layer 1200 may have been a wet-chemical etching method or a dry-chemical etching method. By way of example, the second etching method may have been a dry-chemical etching method using $SF_6/Ar$ or a dry-chemical etching method using $Cl_2/Ar$.

The inner dielectric layer 1200 comprising the inner openings 1210 and the outer dielectric layer 1300 comprising the outer openings 1310 jointly form a diffractive structure 1600. The structure illustrated in FIG. 8 comprising the carrier 1100 and the diffractive structure 1600 arranged above the carrier 1100 forms a diffractive optical element 40. The diffractive structure 1600 is configured to shape by diffraction light that passes through the carrier 1100 and the diffractive structure 1600 in a direction perpendicular to the top side 1101 of the carrier 1100. The diffractive optical element 40 may be used, for example, to generate a light pattern, for example, a point pattern. By way of example, the diffractive optical element 40 may be used to generate a point pattern for use in a depth detection system. The diffractive optical element 40 may also be used to attenuate a light beam, for example, a laser beam, for example, to ensure eye safety of a laser device.

Figure 9:
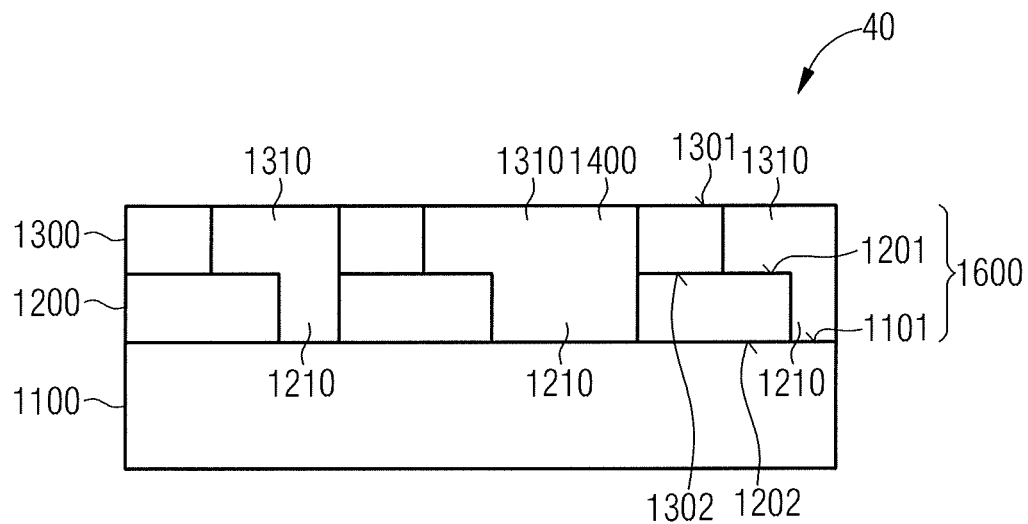
FIG. 9 shows a schematic sectional side view of the carrier and of the dielectric layers after a process of arranging a filling material in openings of the dielectric layers.

FIG. 9 shows a schematic sectional side view of the diffractive optical element 40 in a processing state temporally succeeding the illustration in FIG. 8.

In an optional further processing step, a filling material 1400 has been arranged in the inner openings 1210 and the outer openings 1310 of the diffractive optical element 40. The filling material 1400 arranged in the openings 1210, 1310 of the diffractive optical element 40 may serve to protect the diffractive optical element 40 against damage as a result of external influences. In particular, the filling material 1400 arranged in the openings 1210, 1310 may prevent moisture, for example, condensation water, solvents or other media from the surroundings of the diffractive optical element 40 from penetrating into the openings 1210, 1310 of the diffractive optical element 40.

The filling material 1400 is transparent to electromagnetic radiation in at least some wavelength ranges. The filling material comprises a refractive index that differs from the first refractive index of the inner dielectric layer 1200 and the second refractive index of the outer dielectric layer 1300. By way of example, the refractive index of the filling material 1400 may differ from the first refractive index of the inner dielectric layer 1200 by at least 10%, at least 20% or at least 30%.

The filling material 1400 may comprise, for example, benzocyclobutene (BCB).

The filling material 1400 may have been arranged in the inner openings 1210 and the outer openings 1310 of the diffractive optical element 40, for example, by spin coating. In the example shown in FIG. 9, the filling material arranged in the openings 1210, 1310 terminates flush with the top side 1301 of the outer dielectric layer 1300 of the diffractive optical element 40. However, the filling material 1400 could, for example, also cover the top side 1301 of the outer dielectric layer 1300. The filling material 1400 thus forms a covering layer arranged above the diffractive structure.

Figure 10:
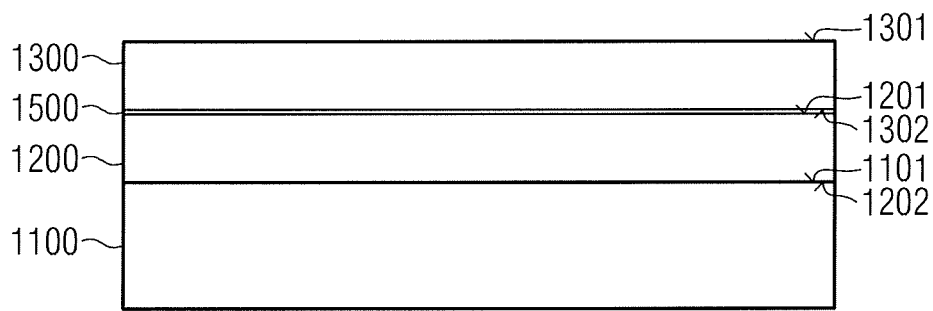
FIG. 10 shows a schematic sectional side view of a carrier and of two dielectric layers arranged above the carrier with an intermediate layer arranged between the dielectric layers.

FIG. 10 shows a schematic sectional side view of the carrier 1100, the inner dielectric layer 1200 arranged above the carrier 1100, and the outer dielectric layer 1300 arranged above the inner dielectric layer 1200, in a processing state corresponding to the illustration in FIG. 6 in accordance with an alternative example of the method described.

In the example shown in FIG. 10, after the process of arranging the inner dielectric layer 1200 above the carrier 1100 and before the process of arranging the outer dielectric layer 1300, an intermediate layer 1500 has been arranged above the inner dielectric layer 1200. Afterward, the outer dielectric layer 1300 has been arranged above the intermediate layer 1500. As a result, the intermediate layer 1500 is now situated between the top side 1201 of the inner dielectric layer 1200 and the underside 1302 of the outer dielectric layer 1300.

The intermediate layer 1500 arranged between the inner dielectric layer 1200 and the outer dielectric layer 1300 may subsequently serve as an etch stop layer during the structuring of the outer dielectric layer 1300. The first etching method used to structure the outer dielectric layer 1300 then attacks the outer dielectric layer 1300, but does not attack the intermediate layer 1500. The outer openings 1310 created in the outer dielectric layer 1300 then extend from the top side 1301 of the outer dielectric layer 1300 as far as the intermediate layer 1500.

Afterward, the intermediate layer 1500 is structured jointly with the inner dielectric layer 1200 by the second etching method used to structure the inner dielectric layer 1200. The second etching method thus attacks the intermediate layer 1500 and the inner dielectric layer 1200, thereby creating openings in the intermediate layer 1500 and the inner openings 1210 in the inner dielectric layer 1200. Alternatively, it is also possible to open the intermediate layer 1500 by a separate etching step performed between the first etching method used to structure the outer dielectric layer 1300 and the second etching method used to structure the inner dielectric layer 1200.

The intermediate layer 1500 may comprise GaAs, for example. If the outer dielectric layer 1300 comprises $SiO_2$, then the first etching method used to structure the outer dielectric layer 1300 may be, for example, an etching method using $CF_4$ and oxygen.

The intermediate layer 1500 may comprise a small thickness of approximately 10 nm, for example.

It is possible to form the diffractive optical element 40 with more than two dielectric layers 1200, 1300. Also, the dielectric layers are individually structured successively from the outside inward selectively by different etching methods.

Figure 11:
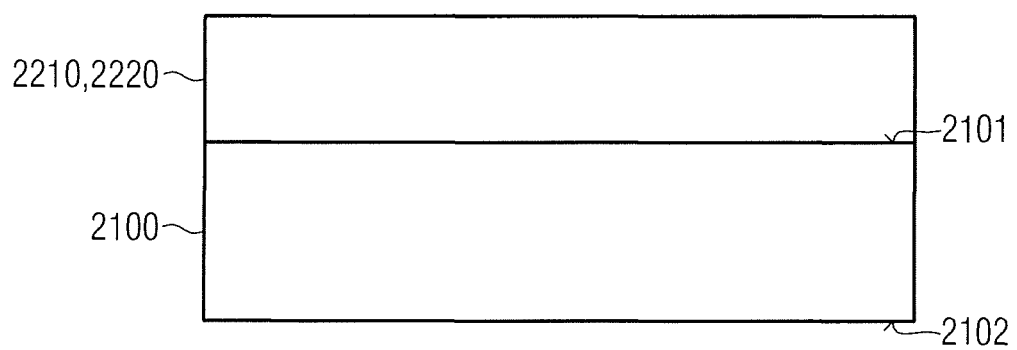
FIG. 11 shows a schematic sectional side view of a carrier with a first layer arranged above a top side.

FIG. 11 shows a schematic sectional side view of a carrier 2100 provided to produce a diffractive optical element. The carrier 2100 may also be referred to as a substrate.

The carrier 2100 is formed as a flat sheet comprising a planar top side 2101 and a planar underside 2102 opposite the top side 2101. The carrier 2100 may comprise, for example, a rectangular shape or a circular disk shape.

The carrier 2100 comprises a material comprising a high transparency for electromagnetic radiation in at least some wavelength ranges. By way of example, the material of the carrier 2100 may be transparent in the infrared and/or in the visible spectral range. The carrier 2100 may comprise, for example, sapphire or a glass.

A first layer 2210 of a first material 2220 has been arranged on the top side 2101 of the carrier 2100. In the example shown in FIG. 11, the first layer 2210 directly adjoins the top side 2101 of the carrier 2100. However, it is likewise possible to provide further layers between the top side 2101 of the carrier 2100 and the first layer 2210.

The first layer 2210 may have been arranged on the top side 2101 of the carrier 2100 by a deposition method, for example. By way of example, arranging the first layer 2210 on the top side 2101 of the carrier 2100 may have been carried out by a growth method, a cathode sputtering method, a vapor deposition method or some other deposition method.

The first material 2220 of the first layer 2210 comprises a refractive index that is greater than a refractive index of the carrier 2100. The first material 2220 of the first layer 2210 may comprise a refractive index of 2.5 or more, for example, in that waveband of the electromagnetic spectrum for which the diffractive optical element to be produced is provided. The first material 2220 of the first layer 2210 may comprise, for example, $Si_3N_4$, GaN or $TiO_2$.

Figure 12:
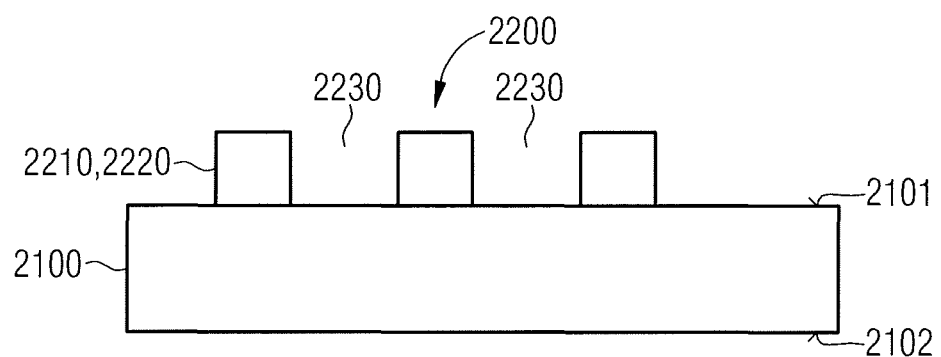
FIG. 12 shows the carrier with a first diffractive structure formed by structuring of the first layer.

FIG. 12 shows a schematic sectional side view of the carrier 2100 and of the first layer 2210 arranged above the top side 2101 of the carrier 2100, in a processing state temporally succeeding the illustration in FIG. 11.

The first layer 2210 has been structured. First openings 2230 have been created in the first layer 2210, the first openings extending through the first layer 2210 as far as the top side 2101 of the carrier 2100. Sections of the first material 2220 of the first layer 2210 have remained between the first openings 2230 created in the first layer 2210.

Creating the first openings 2230 may have been carried out, for example, by an etching method, in particular, for example, by a dry-chemical etching method. For this purpose, a mask may have been arranged above the first layer 2210 beforehand, the openings of the mask having defined the positions of the first openings 2230 created in the first layer 2210. The mask may have been removed again after the process of creating the first openings 2230.

The structured first layer 2210 forms a first diffractive structure 2200. The first diffractive structure 2200 is configured to shape by light diffraction electromagnetic radiation, for example, visible light or light comprising a wavelength from the infrared spectral range passing through the carrier 2100 and the first diffractive structure 2200 in a direction perpendicular to the top side 2101 of the carrier 2100. The first diffractive structure 2200 may be provided, for example, to generate a light pattern, for instance a point pattern.

Figure 13:
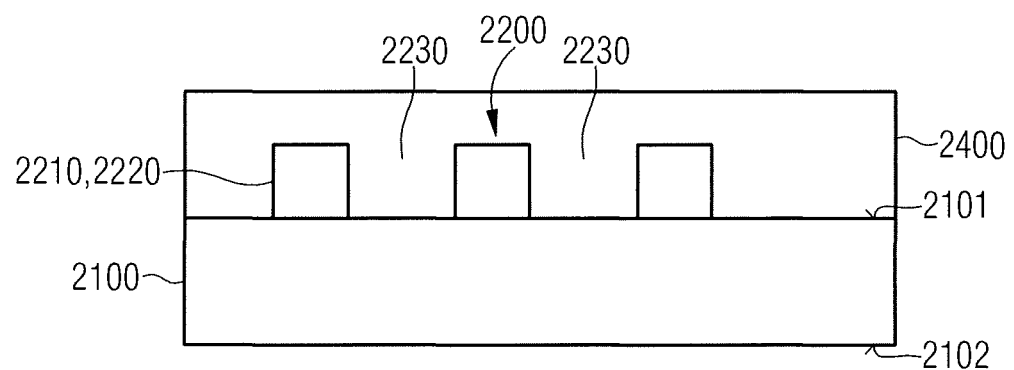
FIG. 13 shows the carrier and the first diffractive structure after a process of covering the first diffractive structure with a first covering layer.

FIG. 13 shows a schematic sectional side view of the carrier 2100 and of the first diffractive structure 2200 formed above the top side 2101 of the carrier 2100, in a processing state temporally succeeding the illustration in FIG. 12.

The first diffractive structure 2200 above the top side 2101 of the carrier 2100 has been covered with a first covering layer 2400. The first covering layer 2400 is provided to protect the first diffractive structure 2200 from ambient influences. The first covering layer 2400 may, for example, prevent condensing moisture from settling on the first diffractive structure 2200 and adversely affecting the functionality of the first diffractive structure 2200. The first covering layer 2400 may also protect the first diffractive structure 2200 from mechanical damage, for example, scratches.

The first covering layer 2400 may comprise, for example, benzocyclobutene (BCB) or $SiO_2$.

The first covering layer 2400 comprises a refractive index that is less than the refractive index of the first diffractive structure 2200. As a result, the first covering layer 2400 does not adversely affect the functionality of the first diffractive structure 2200, or adversely affects it only slightly.

It is expedient if the refractive index of the first covering layer 2400 comprises a value similar to the refractive index of the carrier 2100. The refractive index of the first covering layer 2400 and the refractive index of the carrier 2100 may differ, for example, by not more than 5%, not more than 10% or not more than 20%.

Applying the first covering layer 2400 may have been carried out, for example, by spin coating of the material of the first covering layer 2400 or a cathode sputtering method.

An alternative method of forming the first diffractive structure 2200 on the top side 2101 of the carrier 2100 provides for growing microrods onto the top side 2101 of the carrier 2100. Microrods are micrometer-scale post structures that can be produced by epitaxial growth with a high aspect ratio. Before the growth of the microrods, a mask may be arranged on the top side 2101 of the carrier 2100, the openings of the mask defining the positions of the microrods to be grown.

The first diffractive structure 2200 formed by the growth of microrods on the top side 2101 of the carrier 2100 may subsequently likewise be covered by the first covering layer 2400. The first covering layer 2400 may, for example, also be formed by overgrowth of the first diffractive structure 2200.

Figure 14:
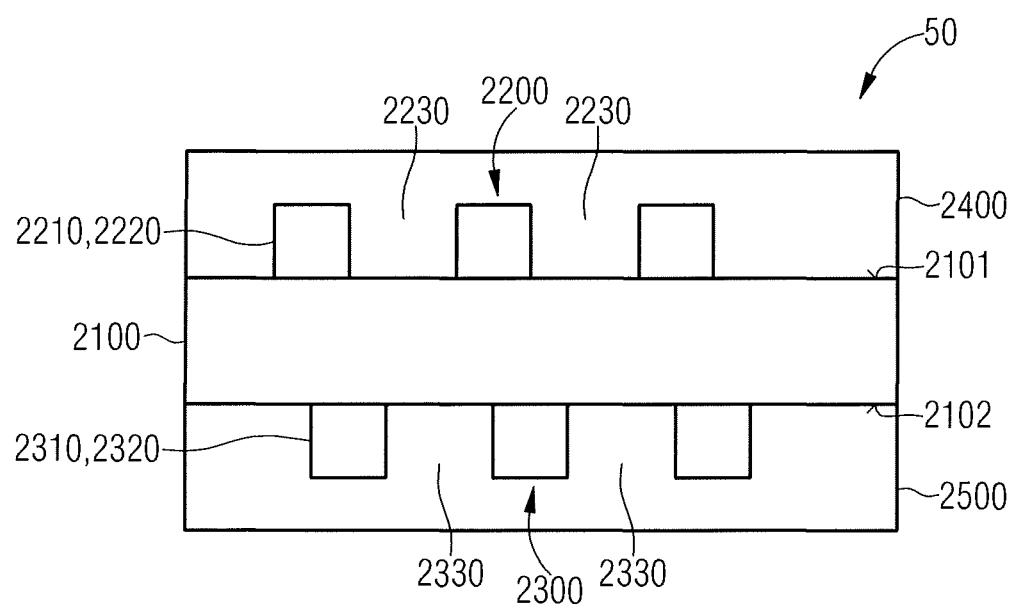
FIG. 14 shows a diffractive optical element formed by arranging a second diffractive structure on an underside of the carrier and covering the second diffractive structure with a second covering layer.

FIG. 14 shows a schematic sectional side view of the carrier 2100 and of the first diffractive structure 2200 arranged on the top side 2101 of the carrier 2100, in a processing state temporally succeeding the illustration in FIG. 13.

A second diffractive structure 2300 has been formed on the underside 2102 of the carrier 2100 opposite the top side 2101 of the carrier 2100. Forming the second diffractive structure 2300 may have been carried out by a method corresponding to one of the above-described methods for forming the first diffractive structure 2200. In particular, the second diffractive structure 2300 may have been formed by the same method as the first diffractive structure 2200.

In this regard, first, a second layer 2310 of a second material 2320 may have been arranged on the underside 2102 of the carrier 2100. The second material 2320 may correspond, for example, to the first material 2220 of the first layer 2210. Afterward, the second layer 2310 may have been structured to form second openings 2330 in the second layer 2310, the second openings extending through the second layer 2310 as far as the underside 2102 of the carrier 2100. Structuring the second layer 2310 may have been carried out, for example, by an etching method, in particular, for example, by a dry-chemical etching method. The structured second layer 2310 forms the second diffractive structure 2300 on the underside 2102 of the carrier 2100.

Afterward, the second diffractive structure 2300 was also covered by a second covering layer 2500. The second covering layer 2500 may be formed like the first covering layer 2400 and may have been applied by the same method as the first covering layer 2400.

The carrier 2100 with the first diffractive structure 2200 arranged on the top side 2101 and the second diffractive structure 2300 arranged on the underside 2102 forms a diffractive optical element 50. The diffractive optical element 50 may serve, for example, to shape light, for example, visible light or light comprising a wavelength from the infrared spectral range. By way of example, the diffractive optical element 50 may be provided to generate a light pattern, for example, a point pattern. The first diffractive structure 2200 and the second diffractive structure 2300 of the diffractive optical element 50 successively shape the light passing through the diffractive optical element 50.

In a simplified example of the diffractive optical element 50, the first covering layer 2400 covering the first diffractive structure 2200 and/or the second covering layer 2500 covering the second diffractive structure 2300 may be dispensed with.

In various example, a diffractive optical element comprises a carrier, a diffractive structure arranged on a top side of the carrier, and a cover arranged above the top side of the carrier and the diffractive structure.

Advantageously, the cover arranged above the top side of the carrier and the diffractive structure of the diffractive optical element protects the diffractive structure from ambient influences. As a result, it is possible to reduce a risk of damage to the diffractive optical element or an adverse effect on the functionality of the diffractive optical element as a result of external influences. By way of example, the cover may prevent the diffractive structure from being scratched and condensing moisture from settling on the diffractive structure.

In one example of the diffractive optical element, the carrier comprises sapphire or a glass. Advantageously, the carrier may thereby comprise a high transparency for electromagnetic radiation in a waveband to shape or attenuate the diffractive optical element is provided. A further advantage is that the diffractive optical element is producible simply and cost-effectively by established standard methods with the use of such a carrier.

The diffractive structure may comprise a plastics material, for example, an epoxy, a silicone, polycarbonate, polymethyl methacrylate, polyetherimide or poly sulfone. Advantageously, the diffractive optical element may thereby be produced simply and cost-effectively.

The cover may be formed as a plate, in particular as a glass plate or as a sapphire plate. Advantageously, the cover may thereby protect the diffractive structure of the diffractive optical element from external influences in a robust manner.

The cover may be secured by a soldering connection on the top side of the carrier. The soldering connection may be, for example, a soldering connection produced at low temperatures, for example, a soldering connection using gold and tin or gold, indium and tin.

The soldering connection may completely enclose the diffractive structure. Advantageously, this enables the diffractive structure of the diffractive optical element to be hermetically impermeably encapsulated and thereby protected against external influences, in particular, for example, against moisture penetrating from outside.

A gap may be formed between the diffractive structure and the cover. By way of example, air or some other gas may be arranged in the gap. Advantageously, this ensures a sufficient difference between the refractive indices of the diffractive structure and the gas arranged in the gap, as a result of which the functionality of the diffractive structure of the diffractive optical element is ensured.

A further diffractive structure may be arranged on a top side of the cover facing the top side of the carrier. The diffractive optical element then comprises two diffractive structures arranged one behind another in the light path. As a result, the diffractive optical element may enable particularly effective beam shaping or beam attenuation.

The cover may be formed as a covering layer covering the top side of the carrier and the diffractive structure. Advantageously, the diffractive optical element is thereby producible particularly simply and cost-effectively and may comprise particularly compact external dimensions. Moreover, the diffractive optical element in this example may be particularly insensitive to external influences.

The cover may comprise silicone, an epoxy, benzocyclobutene (BCB), $SiO_2$ or a glass. Advantageously, a covering layer comprising such a material reliably protects the diffractive structure of the diffractive optical element against external influences.

A method of producing a diffractive optical element may comprise steps of providing a carrier, forming a diffractive structure on a top side, and arranging a cover above the top side of the carrier and the diffractive structure.

Advantageously, a diffractive optical element whose diffractive structure is effectively protected against damage and an adverse effect on the functionality as a result of external influences is obtainable by this method. The method is implementable simply and cost-effectively and may utilize established standard processes.

The cover may be secured by a soldering connection on the top side of the carrier. Advantageously, this may enable a hermetically impermeable encapsulation of the diffractive structure of the diffractive optical element obtainable by the method.

The soldering connection may be produced by isothermal solidification. Advantageously, the diffractive structure is thereby exposed only to a very low thermal loading.

The method may comprise a further step of forming a further diffractive structure on a top side of the cover. The cover is arranged above the top side of the carrier such that the top side of the cover faces the top side of the carrier. The optical element obtainable by the method then comprises two diffractive structures arranged one behind the other in the light path through the diffractive optical element. As a result, the diffractive optical element obtainable by the method may enable particularly effective beam shaping.

The cover may be applied as a covering layer covering the top side of the carrier and the diffractive structure. Advantageously, the method is thereby implementable particularly simply and cost-effectively and makes it possible to produce a diffractive optical element comprising particularly compact external dimensions.

The cover may be applied by a cathode sputtering method. This advantageously enables the method to be performed cost-effectively.

Forming the diffractive structure may comprise steps of applying a material layer on the top side of the carrier and for structuring the material layer by an etching method. Advantageously, forming the diffractive structure in this example may be carried out by established semiconductor processes, as a result of which the method is implementable simply, cost-effectively and reproducibly.

A diffractive optical element may comprise a carrier, an inner dielectric layer arranged above the carrier, the inner dielectric layer comprising inner openings, and an outer dielectric layer arranged above the inner dielectric layer, the outer dielectric layer comprising outer openings.

This diffractive optical element comprises two dielectric layers lying one above the other, that is to say is formed in a multi-stage fashion. One particular advantage here is that the inner dielectric layer and the outer dielectric layer of this diffractive optical element may be structured differently, that is to say that the inner openings and the outer openings may be formed differently. As a result, the diffractive optical element may advantageously be more efficient than a single-stage diffractive optical element and/or enable better beam shaping than a single-stage diffractive optical element. The carrier and the dielectric layers of this diffractive optical element may comprise a high temperature stability, as a result of which the diffractive optical element may advantageously be subjected to processing steps in which a high temperature occurs. By way of example, the diffractive optical element may be suitable for use in a reflow soldering method.

The inner dielectric layer may comprise a first refractive index. The outer dielectric layer comprises a second refractive index. The first refractive index and the second refractive index differ by not more than 20%, preferably by not more than 10%, preferably by not more than 5%. As a result, the inner dielectric layer and the outer dielectric layer of this diffractive optical element comprise similar optical properties, as a result of which light refraction and/or light reflection take place only slightly at the boundary between inner dielectric layer and outer dielectric layer. Nevertheless, the inner dielectric layer and the outer dielectric layer may comprise different materials, thereby enabling separate structuring of the two dielectric layers.

A filling material may be arranged in the inner openings and the outer openings. Advantageously, the diffractive optical element may thereby comprise a planar outer side. As a result, the diffractive optical element is protected against damage or contamination. In particular, the filling material may prevent moisture that penetrates into the inner openings and the outer openings of the diffractive optical element or solvents that penetrate into the inner openings and the outer openings from adversely affecting the functionality of the diffractive optical element.

The filling material may comprise a refractive index that differs from the first refractive index by at least 10%, preferably by at least 20%, particularly preferably by at least 30%. As a result, the functionality of the diffractive optical element is advantageously not adversely affected, or is adversely affected only slightly, by the filling material arranged in the inner openings and the outer openings of the diffractive optical element.

The filling material may comprise benzocyclobutene (BCB). Advantageously, the filling material may thereby be processed simply and comprises a high durability.

An intermediate layer may be arranged between the inner dielectric layer and the outer dielectric layer. The intermediate layer may advantageously simplify separate structuring of the outer dielectric layer and the inner dielectric layer. By way of example, the intermediate layer may serve as an etch stop layer during the structuring of the outer dielectric layer. The intermediate layer may be formed in a very thin fashion such that it does not influence, or only slightly influences, the optical function of the diffractive optical element.

A method of producing a diffractive optical element may comprise steps of providing a carrier, arranging an inner dielectric layer above the carrier, arranging an outer dielectric layer above the inner dielectric layer, structuring the outer dielectric layer to form outer openings in the outer dielectric layer, and structuring the inner dielectric layer to form inner openings in the inner dielectric layer.

The separate structuring of the outer dielectric layer and the inner dielectric layer advantageously makes it possible in this method to structure the outer dielectric layer and the inner dielectric layer differently, that is to say to form the outer openings in the outer dielectric layer and the inner openings in the inner dielectric layer differently. As a result, this method makes it possible to produce a multi-stage diffractive optical element. The multi-stage diffractive optical element obtainable by the method may comprise a higher efficiency in comparison with a single-stage diffractive optical element and/or enable better beam shaping than a single-stage diffractive optical element. The carrier, the inner dielectric layer and the outer dielectric layer of the diffractive optical element obtainable by this method may comprise a high temperature stability, as a result of which the diffractive optical element obtainable by the method may advantageously be suitable for use in high-temperature processes, for example, for use in a reflow soldering method.

The inner dielectric layer may be structured through the outer openings of the outer dielectric layer. Advantageously, this enables simple structuring of the inner dielectric layer.

An intermediate layer may be arranged between the inner dielectric layer and the outer dielectric layer. The intermediate layer is structured jointly with the inner dielectric layer. Advantageously, the intermediate layer between the inner dielectric layer and the outer dielectric layer may simplify the separate structuring of the outer dielectric layer and the inner dielectric layer. The intermediate layer may serve as an etch stop layer, for example, during the structuring of the outer dielectric layer. The use of the intermediate layer as an etch stop layer may enable a greater freedom in the choice of materials of the inner dielectric layer and the outer dielectric layer.

The intermediate layer may comprise GaAs. Advantageously, an intermediate layer comprising GaAs may serve as an etch stop layer in an etching method using $CF_4$ and oxygen.

Structuring the outer dielectric layer may be carried out by a first etching method. The etching method may be a wet-chemical or a dry-chemical etching method. By way of example, structuring the outer dielectric layer may be carried out by a wet-chemical etching method using hydrofluoric acid or a dry-chemical etching method using fluorine gas.

The first etching method may attack the outer dielectric layer, but not the inner dielectric layer. Advantageously, this enables separate structuring of the outer dielectric layer and the inner dielectric layer, without the need for an etch stop layer arranged between the inner dielectric layer and the outer dielectric layer.

The first etching method may attack the outer dielectric layer, but not the intermediate layer arranged between the inner dielectric layer and the outer dielectric layer. Advantageously, this also enables separate structuring of the outer dielectric layer and the inner dielectric layer. Provision of the intermediate layer enables greater freedoms in the choice of materials of the inner dielectric layer and the outer dielectric layer.

Structuring the inner dielectric layer may be carried out by a second etching method. The second etching method may be, for example, a wet-chemical or a dry-chemical etching method. By way of example, the second etching method may be a dry-chemical etching method using $SF_6$/Ar or a dry-chemical etching method using $Cl_2$/Ar.

The method may comprise a further step of arranging a filling material in the inner openings and the outer openings. Arranging the filling material in the openings of the dielectric layers may protect the diffractive optical element obtainable by the method against damage as a result of external influences. By way of example, arranging the filling material in the openings of the diffractive optical element makes it possible to prevent moisture that penetrates into the openings of the diffractive optical element from adversely affecting the functionality of the diffractive optical element obtainable by the method.

The inner dielectric layer may comprise $MgF_2$ and the outer dielectric layer may comprise $SiO_2$. Advantageously, the inner dielectric layer and the outer dielectric layer may then be structured separately from one another by different etching methods.

The inner dielectric layer may comprise $TiO_2$ and the outer dielectric layer may comprise $Si_3N_4$. Advantageously, also, the outer dielectric layer and the inner dielectric layer may be structured separately from one another by different etching methods.

A diffractive optical element may comprise a carrier, a first diffractive structure arranged on a top side of the carrier, and a second diffractive structure arranged on an underside of the carrier.

Advantageously, this diffractive optical element thus comprises two monolithically integrated diffractive structures. The two diffractive structures are arranged one behind the other in the light path. The two diffractive structures may be structured differently. As a result, the diffractive optical element may enable more precise beam shaping than for a diffractive optical element comprising only one diffractive structure. As a result of the monolithic integration of the two diffractive structures, the diffractive optical element may be formed in a very robust fashion.

The first diffractive structure may be covered by a first covering layer. Advantageously, the first covering layer protects the first diffractive structure against damage or an adverse effect on the functionality of the first diffractive structure as a result of external influences. In particular, the first covering layer may prevent the functionality of the first diffractive structure of the diffractive optical element from being reduced by moisture settling on the first diffractive structure.

The first covering layer may comprise benzocyclobutene (BCB) or $SiO_2$. Advantageously, the covering layer may thereby be arranged above the first diffractive structure simply and cost-effectively and comprises a high durability visa vis ambient influences.

The first covering layer may comprise a refractive index that is less than a refractive index of the first diffractive structure. Advantageously, as a result the first covering layer does not adversely affect the functionality of the first diffractive structure of the diffractive optical element or adversely affects it only slightly.

The first covering layer may comprise a refractive index that differs from a refractive index of the carrier by not more than 20%, preferably by not more than 10%, preferably by not more than 5%. Advantageously, as a result, the first covering layer does not adversely affect the functionality of the first diffractive structure of this diffractive optical element or adversely affects it only slightly.

The first diffractive structure may comprise $Si_3N_4$, GaN or $TiO_2$. Advantageously, the first diffractive structure thereby comprises a high refractive index. Moreover, such a choice of materials enables simple and cost-effective production of the first diffractive structure by established semiconductor processes.

The carrier may comprise a glass or sapphire. Advantageously, the carrier thereby comprises a high transparency in wavelength ranges relevant to the production of diffractive optical elements.

The second diffractive structure may be covered by a second covering layer. Advantageously, the second covering layer may protect the second diffractive structure of this diffractive optical element against external influences. By way of example, the second covering layer may protect the second diffractive structure against scratches, condensing moisture or solvents. As a result, the second covering layer may advantageously prevent an impairment of the functionality of the second diffractive structure of the diffractive optical element.

A method of producing a diffractive optical element may comprise steps of providing a carrier, forming a first diffractive structure on a top side of the carrier, and forming a second diffractive structure on an underside of the carrier.

Advantageously, this method makes it possible to produce a diffractive optical element comprising two monolithically integrated diffractive structures. The two diffractive structures of the diffractive optical element obtainable by the method are arranged serially one behind the other in the light path of the diffractive optical element and may be structured differently. As a result, the diffractive optical element obtainable by the method may enable better light shaping than for a diffractive optical element comprising only one diffractive structure. As a result of the monolithic integration, the diffractive optical element obtainable by the method is advantageously formed robustly and in a manner insensitive to external influences. A further advantage is that the production method may be performed cost-effectively.

The method may comprise a further step of covering the first diffractive structure with a first covering layer. The covering layer may protect the first diffractive structure of the optical element obtainable by the method against an adverse effect on its functionality as a result of external influences. By way of example, the first covering layer may protect the first diffractive structure against condensing moisture, against solvents or against scratches. Covering the first diffractive structure with the first covering layer may be carried out, for example, by a cathode sputtering method or spin coating.

Forming the first diffractive structure may comprise steps of arranging a layer of a first material on the top side of the carrier, and structuring the layer to form openings in the layer. Advantageously, this method enables the first diffractive structure to be fashioned precisely. The method may utilize established and cost-effective semiconductor processes.

The structuring may be carried out by an etching method, preferably by a dry-chemical etching method. Advantageously, the method is thereby implementable cost-effectively and with high reproducibility.

Arranging the first diffractive structure may comprise growing microrods onto the top side of the carrier. Advantageously, the method in this variant, too, enables simple, cost-effective and readily reproducible production of the first diffractive structure.

Figure 15:
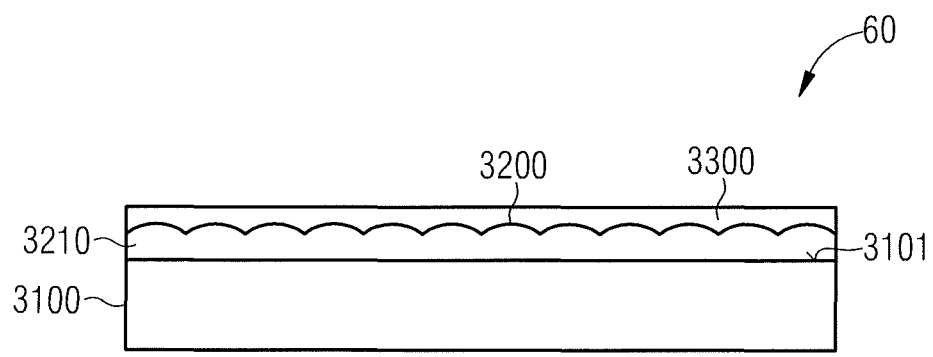
FIG. 15 shows a schematic sectional side view of a multi-lens element including a multi-lens structure arranged above a top side of a carrier and a covering layer arranged above the multi-lens structure.

FIG. 15 shows a schematic sectional side view of a multi-lens element 60. The multi-lens element 60 is configured to shape by light refraction electromagnetic radiation, for example, visible light or infrared light passing through the multi-lens element 60. By way of example, the multi-lens element 60 may be provided to attenuate a light beam, for example, a laser beam. By way of example, the multi-lens element 60 may be provided to attenuate a laser beam generated by a laser device to an extent such that eye safety of the laser device is ensured.

The multi-lens element 60 comprises a carrier 3100. The carrier 3100 is formed as a flat sheet comprising a planar top side 3101. The carrier 3100 may also be referred to as a substrate.

The carrier 3100 comprises a material transparent to electromagnetic radiation in at least some wavelength ranges, for example, to visible light and/or light comprising a wavelength from the infrared spectral range. The carrier 3100 may comprise, for example, sapphire, a glass, an epoxy or an Ormocer. In the wavelength ranges mentioned, the carrier 3100 may comprise, for example, a refractive index of 1.4 to 1.7.

A material layer 3210 is arranged on the top side 3101 of the carrier 3100. The material layer may comprise, for example, an epoxy, $Si_3N_4$, $TiO_2$.

The material layer 3210 has been structured such that a multi-lens structure 3200 has been formed on that side of the material layer 3210 facing away from the top side 3101 of the carrier 3100. The structuring of the material layer 3210 may have been carried out, for example, by an etching method or a printing method, in particular, for example, a nano-imprint method.

The multi-lens structure 3200 may also be referred to as a multi-lens array. The multi-lens structure 3200 comprises a multiplicity of lens structures arranged in a regular, a partly regular or an irregular structure. The lens structures of the multi-lens structure 3200 may comprise, for example, structure sizes of 5 µm to 10 µm and structure heights of more than 2 µm. The multi-lens structure 3200 is configured to shape by light refraction electromagnetic radiation, for example, visible light or infrared light passing through the multi-lens element 60.

A cover formed as a covering layer 3300 is arranged above the multi-lens structure 3200 of the multi-lens element 60. The covering layer 3300 covers the multi-lens structure 3200 and thereby brings about a planarization on the outer side of the multi-lens element 60. The covering layer 3300 protects the multi-lens structure 3200 of the multi-lens element 60 against external influences, for example, against damage as a result of mechanical influences or an adverse effect on the efficacy of the multi-lens structure 3200 as a result of contamination or deposits from the surroundings.

The covering layer 3300 may comprise, for example, a silicone, an epoxy, benzocyclobutene, $Si_3N_4$, $Al_2O_3$, $SiO_2$ or a glass. In the wavelength range for which the multi-lens element 60 is provided, for example, in the visible wavelength range or in the infrared wavelength range, the covering layer 3300 comprises a refractive index that is lower than the refractive index of the material layer 3210 and of the multi-lens structure 3200 formed in the material layer.

Figure 16:
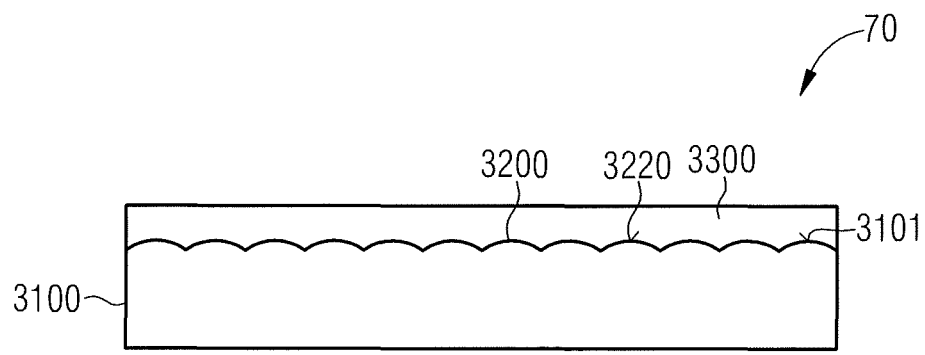
FIG. 16 shows a schematic sectional side view of a further multi-lens element including a multi-lens structure formed on a top side of a carrier and a covering layer arranged above the multi-lens structure.

FIG. 16 shows a schematic sectional side view of a multi-lens element 70. The multi-lens element 70 comprises similarities with the multi-lens element 60 in FIG. 15. A description is given below merely of the aspects in which the multi-lens element 70 in FIG. 16 differs from the multi-lens element 60 in FIG. 15. Otherwise, the above description of the multi-lens element 60 in FIG. 15 also applies to the multi-lens element 70 in FIG. 16.

In the multi-lens element 70 in FIG. 16, the carrier 3100 comprises a material transparent in the wavelength range for which the multi-lens element 70 is provided, and comprises a high refractive index. The wavelength range may be, for example, the visible wavelength range or the infrared wavelength range. The refractive index of the material of the carrier 3100 may be greater than 2, for example, in this wavelength range. The carrier may comprise, for example, GaAs, GaP or GaN.

In the multi-lens element 70, the top side 3101 of the carrier 3100 has been structured such that the multi-lens structure 3200 has been formed. A cover arranged as a covering layer 3300 has once again been arranged above the multi-lens structure 3200, the cover bringing about a planarization. In the multi-lens element 70 in FIG. 16, the multi-lens structure 3200 has thus been formed at an interface 3220 between the carrier 3100 and the covering layer 3300.

Structuring the top side 3101 of the carrier 3100 to form the multi-lens structure 3200 may have been carried out, for example, by customary lithographic methods of semiconductor structuring.

In the multi-lens element 70, in the wavelength range for which the multi-lens element 70 is provided, the covering layer 3300 comprises a refractive index that is less than the refractive index of the carrier 3100. In the multi-lens element 70, the covering layer 3300 may comprise, for example, $SiO_2$, $Si_3N_4$, $Al_2O_3$, benzocyclobutene or a glass, for example, a glass that may be applied by spin coating.

Figure 17:
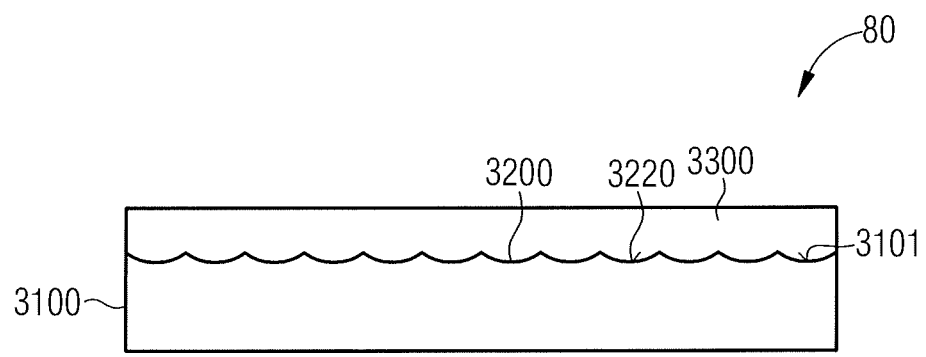
FIG. 17 shows a schematic sectional side view of a further multi-lens element including a multi-lens structure formed above a top side of a carrier and a covering layer arranged above the multi-lens structure.

FIG. 17 shows a schematic sectional side view of a multi-lens element 80. The multi-lens element 80 in FIG. 17 largely corresponds to the multi-lens element 70 in FIG. 16. A description is given below only of the aspects in which the multi-lens element 80 in FIG. 17 differs from the multi-lens element 70 shown in FIG. 16. For the rest, the above description of the multi-lens element 70 also applies to the multi-lens element 80.

In the multi-lens element 80, the carrier 3100 comprises a material whose refractive index in the wavelength range for which the multi-lens element 80 is provided is less than the refractive index of the covering layer 3300. The material of the carrier 3100 of the multi-lens element 80 may comprise, for example, a refractive index that is 1.4 to 1.7. The covering layer 3300 of the multi-lens element 80 may comprise, for example, a refractive index that is above 1.5 or above 1.75. The carrier 3100 of the multi-lens element 80 may comprise, for example, a glass, an Ormocer, sapphire or $SiO_2$. The covering layer 3300 may comprise, for example, $Si_3N_4$, $TiO_2$ or an aluminum oxide.

In the multi-lens element 80, too, the top side 3101 of the carrier 3100 has been structured such that the multi-lens structure 3200 has been formed at the interface 3220 between the carrier 3100 and the covering layer 3300. However, the structuring of the top side 3101 of the carrier 3100 in the multi-lens element 80 has been carried out such that the multi-lens structure 3200 of the multi-lens element 80 forms a negative relative to the multi-lens structure 3200 of the multi-lens element 70 in FIG. 16. In the multi-lens element 80, structuring the top side 3101 of the carrier 3100 can be carried out, for example, by a molding method, for example, compression molding.

Figure 18:
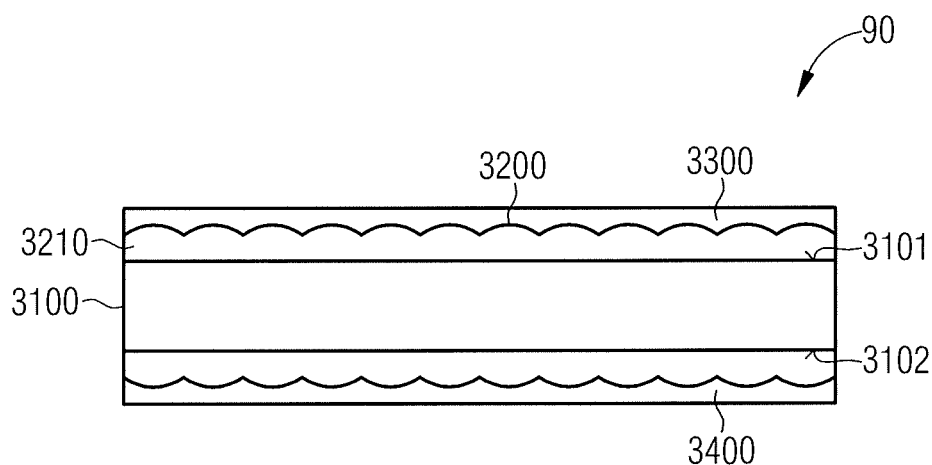
FIG. 18 shows a schematic sectional side view of an optically effective element including a multi-lens structure arranged on a top side of a carrier and a multi-lens structure arranged on an underside of the carrier.

FIG. 18 shows a schematic sectional side view of an optically effective element 90. The optically effective element 90 largely corresponds to the multi-lens element 60 shown in FIG. 15. A description is given below of the aspects in which the optically effective element 90 in FIG. 18 differs from the multi-lens element 60 in FIG. 15. For the rest, the above description of the multi-lens element 60 shown in FIG. 15 also applies to the optically effective element 90 in FIG. 18.

In the optically effective element 90, in addition to the multi-lens structure 3200 arranged on the top side 3101 of the carrier 3100, a further multi-lens structure 3400 is present, which is arranged on an underside 3102 of the carrier 3100 opposite the top side 3101 of the carrier 3100.

In the optically effective element 90 shown in FIG. 18, both the multi-lens structure 3200 arranged on the top side 3101 of the carrier 3100 and the further multi-lens structure 3400 arranged on the underside 3102 of the carrier 3100 are formed like the multi-lens structure 3200 of the multi-lens element 60 shown in FIG. 15. That means that both the multi-lens structure 3200 and the further multi-lens structure 3400 are each formed in a structured material layer and covered by a covering layer. In further examples, however, both the multi-lens structure 3200 arranged on the top side 3101 of the carrier 3100 and the further multi-lens structure 3400 arranged on the underside 3102 of the carrier 3100 may optionally be formed like the multi-lens structure 3200 of the multi-lens element 70 shown in FIG. 16 or like the multi-lens structure 3200 of the multi-lens element 80 shown in FIG. 17. It is likewise possible for the covering layer to be omitted in the multi-lens structure 3200 arranged on the top side 3101 of the carrier 3100 or in the further multi-lens structure 3400 arranged on the underside 3102 of the carrier 3100.

By virtue of the fact that the optically effective element 90 comprises two multi-lens structures 3200, 3400, the optically effective element 90 may bring about particularly effective beam shaping of electromagnetic radiation, for example, visible light or infrared light passing through the optically effective element 90 in a direction perpendicular to the top side 3101 of the carrier 3100. By way of example, the optically effective element 90 may expand a light beam, for example, a laser beam to reduce a luminance of the laser beam.

Figure 19:
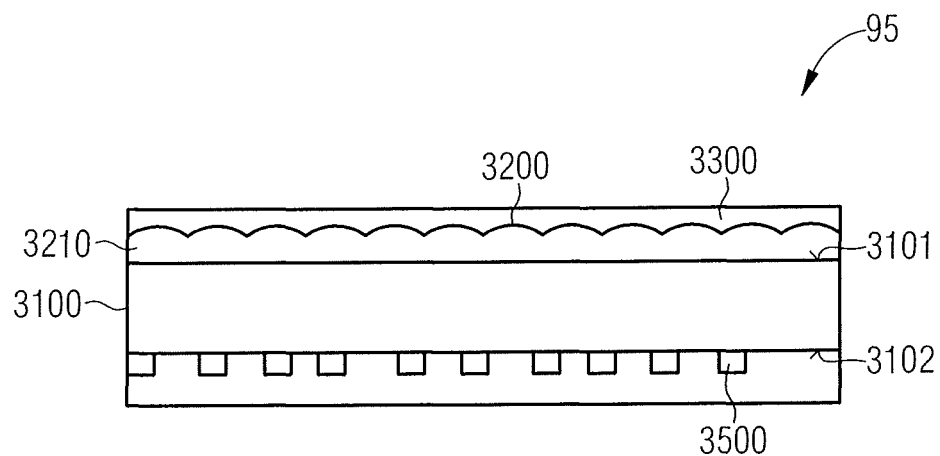
FIG. 19 shows a schematic sectional side view of an optically effective element including a multi-lens structure arranged on a top side of a carrier and a diffractive structure arranged on an underside of the carrier.

FIG. 19 shows a schematic sectional side view of an optically effective element 95. The optically effective element 95 in FIG. 19 largely corresponds to the optically effective element 90 in FIG. 18. A description is given below of the extent to which the optically effective element 95 in FIG. 19 differs from the optically effective element 90 shown in FIG. 18. For the rest, the above description of the optically effective element 90 shown in FIG. 18 also applies to the optically effective element 95 shown in FIG. 19.

In the optically effective element 95, a diffractive structure 3500 is arranged on the underside 3102 of the carrier 3100 instead of the further multi-lens structure 3400 of the optically effective element 90. The diffractive structure 3500 is covered by a covering layer, which brings about a planarization of the outer side of the optically effective element 95. The diffractive structure 3500 of the optically effective element 95 is thus formed like the diffractive structure 200 of the diffractive optical element 30 described with reference to FIG. 5. Alternatively, however, the diffractive structure 3500 of the optically effective element 95 may also be formed like the diffractive structure 1600 of the diffractive optical element 40 described with reference to FIGS. 8 and 9.

Moreover, in the optically effective element 95, either the covering layer 3300 of the multi-lens structure 3200 or the covering layer of the diffractive structure 3500 may also be omitted.

Generally, an optically effective element comprises a carrier, an optically effective structure arranged on a top side of the carrier, and a cover arranged above the optically effective structure.

The diffractive optical element 10 described with reference to FIG. 3, the diffractive optical element 20 described with reference to FIG. 4, the diffractive optical element 30 described with reference to FIG. 5, the diffractive optical element 40 described with reference to FIGS. 8 and 9, the diffractive optical element 50 described with reference to FIG. 14, the multi-lens element 60 described with reference to FIG. 15, the multi-lens element 70 described with reference to FIG. 16, the multi-lens element 80 described with reference to FIG. 17, the optically effective element 90 described with reference to FIG. 18 and the optically effective element 95 described with reference to FIG. 19 represent examples of optically effective elements in this sense.

The diffractive structure 200 of the diffractive optical elements 10, 20, 30, the diffractive structure 1600 of the diffractive optical element 40, the diffractive structures 2200, 2300 of the diffractive optical element 50, the multi-lens structures 3200 of the multi-lens elements 60, 70, 80 and of the optically effective elements 90, 95, the multi-lens structure 3400 of the optically effective element 90 and the diffractive structure 3500 of the optically effective element 95 represent examples of optically effective structures. The diffractive structures 200, 1600, 2200, 2300, 3500 act by way of the principle of light diffraction. The multi-lens structures 3200, 3400 act by way of the principle of light refraction.

The covering plate 310 of the diffractive optical elements 10, 20, the covering layer 320 of the diffractive optical element 30, the filling material 1400 of the diffractive optical element 40, the covering layers 2400, 2500 of the diffractive optical element 50 and the covering layers 3300 of the multi-lens elements 60, 70, 80 and of the optically effective elements 90, 95 represent examples of covers arranged above the optically effective structure.

The optically effective structures in the diffractive optical elements 10, 20 in FIGS. 3 and 4 may be formed like the diffractive structure 1600 of the diffractive optical element 40 in FIG. 8. In the diffractive optical element 50 shown in FIG. 14, one or both of the optically effective structures may be formed like the diffractive structure 1600 of the diffractive optical element 40 shown in FIG. 8.

Figure 20:
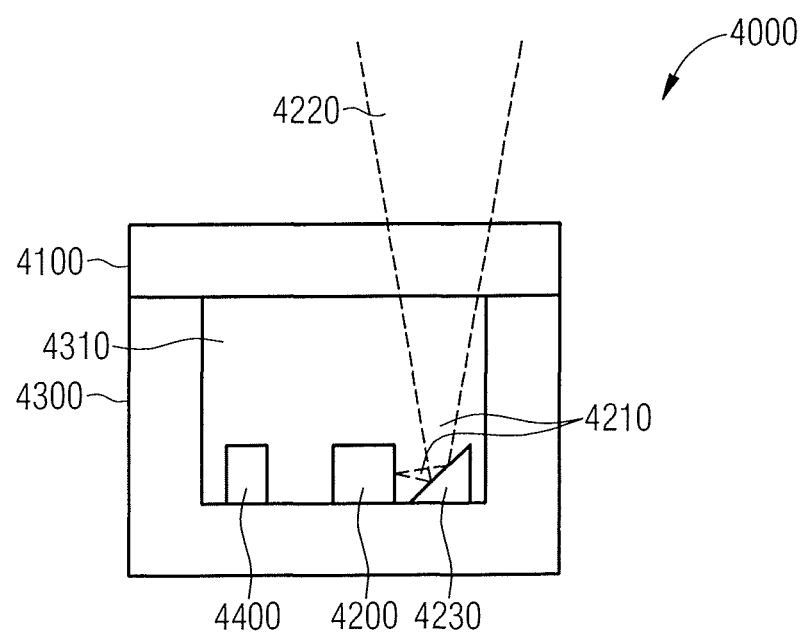
FIG. 20 shows a schematic sectional side view of an optoelectronic component including an optically effective element.

FIG. 20 shows a highly schematic sectional side view of an optoelectronic component 4000.

The optoelectronic component 4000 comprises an optoelectronic semiconductor chip 4200 configured to emit electromagnetic radiation. By way of example, the optoelectronic semiconductor chip 4200 may be configured to emit visible light or light comprising a wavelength from the infrared spectral range. In the example of the optoelectronic component 4000 as shown in FIG. 20, the optoelectronic semiconductor chip 4200 is formed as an edge emitting laser chip. Alternatively, however, the optoelectronic semiconductor chip 4200 of the optoelectronic component 4000 could, for example, also be formed as a vertically emitting laser chip or as a light emitting diode chip.

The optoelectronic component 4000 furthermore comprises a housing 4300 comprising a cavity 4310. The optoelectronic semiconductor chip 4200 is arranged in the cavity 4310 of the housing 4300. In the cavity 4310 of the housing 4300, the optoelectronic semiconductor chip 4200 is electrically contacted in a manner not illustrated in detail. By way of example, the optoelectronic semiconductor chip 4200 may be electrically contacted by bond wires.

The optoelectronic component 4000 furthermore comprises an optically effective element 4100. The optically effective element 4100 is arranged such that electromagnetic radiation 4210 emitted by the optoelectronic semiconductor chip 4200 passes through the optically effective element 4100. For this purpose, in the optoelectronic component 4000 as shown in FIG. 20, a beam deflection arrangement 4230 is provided, which deflects the electromagnetic radiation 4210 emitted by the optoelectronic semiconductor chip 4200 in the direction of the optically effective element 4100. The beam deflection arrangement 4230 may be formed, for example, as a mirror arranged in the cavity 4310 of the housing 4300.

In the optoelectronic component 4000 as shown in FIG. 20, the optically effective element 4100 is arranged such that the optically effective element 4100 closes the cavity 4310 of the housing 4300. The cavity 4310 of the housing 4300 may be closed hermetically impermeably by the optically effective element 4100.

The optically effective element 4100 of the optoelectronic component 4000 is formed like one of the optically effective elements described above with reference to FIGS. 1 to 19. By way of example, the optically effective element 4100 may be formed like one of the diffractive optical elements 10, 20, 30, 40, 50, like one of the multi-lens elements 60, 70, 80 or like one of the optically effective elements 90, 95.

The optically effective element 4100 of the optoelectronic component 4000 is provided to shape the electromagnetic radiation 4210 emitted by the optoelectronic semiconductor chip 4200 to form a light pattern 4220 emitted from the optoelectronic component 4000 into the surroundings of the optoelectronic component 4000. The light pattern 4220 may be, for example, a point pattern, a checkered pattern, a rectangular light spot or a circular light spot.

The optoelectronic component 4000 may be, for example, part of a system for depth detection. The light pattern 4220 emitted by the optoelectronic component 4000 may be, for example, a point pattern. The electromagnetic radiation 4210 emitted by the optoelectronic component 4000 may comprise, for example, a wavelength from the infrared spectral range.

The optoelectronic component 4000 may alternatively, for example, also be part of a system of identifying a person by a scan of an iris of the person. The optoelectronic component 4000 may be provided to illuminate the region of one or both eyes of a person. The electromagnetic radiation 4210 emitted by the optoelectronic component 4000 may be, for example, a wavelength from the infrared spectral range or a wavelength from the visible spectral range. The light pattern 4220 emitted by the optoelectronic component 4000 may be, for example, a rectangular or circular light spot.

The optically effective element 4100 of the optoelectronic component 4000 may also be provided to attenuate a luminance of the electromagnetic radiation 4210 emitted by the optoelectronic semiconductor chip 4200 such that eye safety of the optoelectronic component 4000 is ensured. This may be carried out by a beam expansion of the electromagnetic radiation 4210 emitted by the optoelectronic semiconductor chip 4200. The light pattern 4220 may then be, for example, a rectangular or circular light spot.

The optoelectronic component 4000 may comprise a driver chip 4400, which may be arranged, for example, in the cavity 4310 of the housing 4300. The driver chip 4400 may be provided to drive the optoelectronic semiconductor chip 4200. It is also possible for a plurality of driver chips 4400 to be provided and arranged in the cavity 4310 of the housing 4300. However, the driver chip 4400 may also be omitted or arranged elsewhere at the housing 4300.

Figure 21:
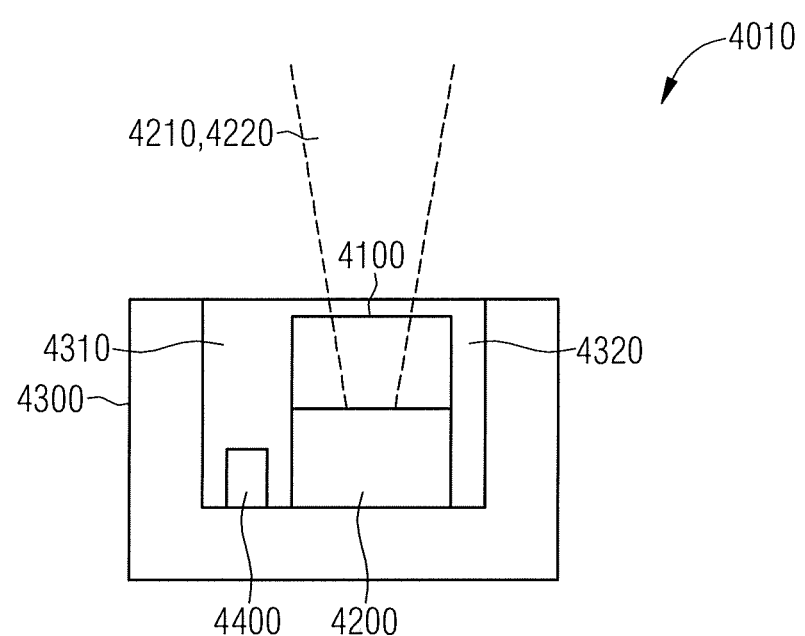
FIG. 21 shows a schematic sectional side view of a further optoelectronic component including an optically effective element.

FIG. 21 shows a schematic sectional side view of an optoelectronic component 4010. The optoelectronic component 4010 comprises correspondences with the optoelectronic component 4000 in FIG. 20. An explanation is given below of the extent to which the optoelectronic component 4010 in FIG. 21 differs from the optoelectronic component 4000 in FIG. 20. Otherwise, the above description of the optoelectronic component 4000 also applies to the optoelectronic component 4010 shown in FIG. 21.

In the optoelectronic component 4010, the optoelectronic semiconductor chip 4200 is formed as a vertically emitting laser chip. Alternatively, the optoelectronic semiconductor chip 4200 of the optoelectronic component 4010 could also be formed as a light emitting diode chip.

In the optoelectronic component 4010, the optically effective element 4100 is arranged directly adjacent to the optoelectronic semiconductor chip. As a result, electromagnetic radiation 4210 emitted by the optoelectronic semiconductor chip 4200 passes directly into the optically effective element 4100, passes through the optically effective element 4100 and in so doing is shaped by the optically effective element 4100 to form the light pattern 4220. The light pattern 4220 is emitted by the optoelectronic component 4010 into the surroundings of the optoelectronic component 4010.

In the optoelectronic component 4010 as shown in FIG. 21, the optically effective element 4100 is arranged together with the optoelectronic semiconductor chip 4200 in the cavity 4310 of the housing 4300. Moreover, the driver chip 4400 is arranged in the cavity 4310 of the housing 4300, which driver chip, however, may also be omitted or may be arranged elsewhere.

In the optoelectronic component 4010 as shown in FIG. 21, the cavity 4310 is filled with a potting material 4320. The optoelectronic semiconductor chip 4200 and the optically effective element 4100 are at least partly embedded into the potting material 4320. As a result, the optoelectronic semiconductor chip 4200 and the optically effective element 4100 are protected against external influences. The potting material 4320 may comprise a silicone, for example. However, the potting material 4320 may also be omitted.

Further optical component parts may be present in the optoelectronic component 4000 in FIG. 20 and in the optoelectronic component 4010 in FIG. 21. By way of example, the optoelectronic component 4000 and the optoelectronic component 4010 may each be equipped with optical lenses that serve to further shape or deflect the light pattern 4220 generated by the optically effective element 4100.

Our elements, methods and components have been illustrated and described in greater detail on the basis of preferred examples. Nevertheless, this disclosure is not restricted to the examples. Rather, other variations may be derived therefrom by those skilled in the art without departing from the scope of protection of the appended claims.

The invention claimed is:

1. An optoelectronic component comprising:
   an optoelectronic semiconductor chip configured to emit electromagnetic radiation;
   an optically effective element arranged such that electromagnetic radiation emitted by the optoelectronic semiconductor chip passes through the optically effective element; and
   a housing,
   wherein the optoelectronic semiconductor chip is arranged in a cavity of the housing,
   the optically effective element comprises a carrier,
   a first optically effective structure arranged on a top side of the carrier, and
   a cover arranged above the first optically effective structure,
   wherein the optically effective element is arranged in the cavity of the housing.

2. The optoelectronic component according to claim 1, wherein the optoelectronic semiconductor chip is formed as a vertically emitting laser chip.

3. The optoelectronic component according to claim 1, wherein the optoelectronic semiconductor chip is formed as a light emitting diode chip.

4. The optoelectronic component according to claim 1, wherein the optically effective element is arranged directly adjacent to the optoelectronic semiconductor chip.

5. The optoelectronic component according to claim 1, wherein a potting material is arranged in the cavity.

6. The optoelectronic component according to claim 5, wherein the optoelectronic semiconductor chip and the optically effective element are at least partly embedded into the potting material.

7. The optoelectronic component according to claim 1, wherein the optically effective element is configured to shape light emitted by the optoelectronic semiconductor chip to form a light pattern.

8. The optoelectronic component according to claim 7, wherein the light pattern is a point pattern, a checkered pattern, a rectangular light spot or a circular light spot.

9. The optoelectronic component according to claim 1, wherein the first optically effective structure is a multi-lens structure.

10. The optoelectronic component according to claim 9,
    wherein a material layer is arranged on the top side of the carrier, and
    the multi-lens structure is formed in the material layer.

11. The optoelectronic component according to claim 9, wherein the top side of the carrier is structured such that the multi-lens structure is formed.

12. The optoelectronic component according to claim 1, wherein the first optically effective structure is a diffractive structure.

13. The optoelectronic component according to claim 12, wherein the diffractive structure comprises an inner dielectric layer arranged on the top side of the carrier, said inner dielectric layer comprising inner openings, and an outer dielectric layer arranged above the inner dielectric layer, said outer dielectric layer comprising outer openings.

14. The optoelectronic component according to claim 13,
    wherein the inner dielectric layer comprises a first refractive index,
    the outer dielectric layer comprises a second refractive index, and
    the first refractive index and the second refractive index differ by not more than 20%.

15. The optoelectronic component according to claim 13, wherein an intermediate layer is arranged between the inner dielectric layer and the outer dielectric layer.

16. The optoelectronic component according to claim 13, wherein the cover comprises a filling material arranged in the inner openings and the outer openings.

17. The optoelectronic component according to claim 14,
    wherein the cover comprises a filling material arranged in the inner openings and the outer openings, and
    the filling material comprises a refractive index that differs from the first refractive index by at least 10%.

18. The optoelectronic component according to claim 1, wherein the cover is formed as a first covering layer covering the first optically effective structure.

19. The optoelectronic component according to claim 18, wherein the first covering layer has a refractive index that differs from a refractive index of the carrier by not more than 20%.

20. The optoelectronic component according to claim 1,
    wherein the cover is formed as a first covering layer covering the top side of the carrier and the first optically effective structure, and
    the first covering layer has a refractive index less than a refractive index of the first optically effective structure.

21. The optoelectronic component according to claim 12, wherein the cover is a plate, a glass plate or a sapphire plate.

22. The optoelectronic component according to claim 21, wherein the cover is secured by a soldering connection on the top side of the carrier.

23. The optoelectronic component according to claim 22, wherein the soldering connection completely encloses the first optically effective structure.

24. The optoelectronic component according to claim 23, wherein the first optically effective structure is hermetically impermeably encapsulated by the soldering connection.

25. The optoelectronic component according to claim 21, wherein a gap is formed between the first optically effective structure and the cover.

26. The optoelectronic component according to claim 21, wherein a further optically effective structure is arranged on a top side of the cover facing the top side of the carrier.

27. The optoelectronic component according to claim 1, wherein a second optically effective structure is arranged on an underside of the carrier.

28. The optoelectronic component according to claim 27, wherein the second optically effective structure is covered by a second covering layer.

29. The optoelectronic component according to claim 27, wherein the second optically effective structure is a multi-lens structure.

30. The optoelectronic component according to claim 27, wherein the second optically effective structure is a diffractive structure.

* * * * *